Figure 1:
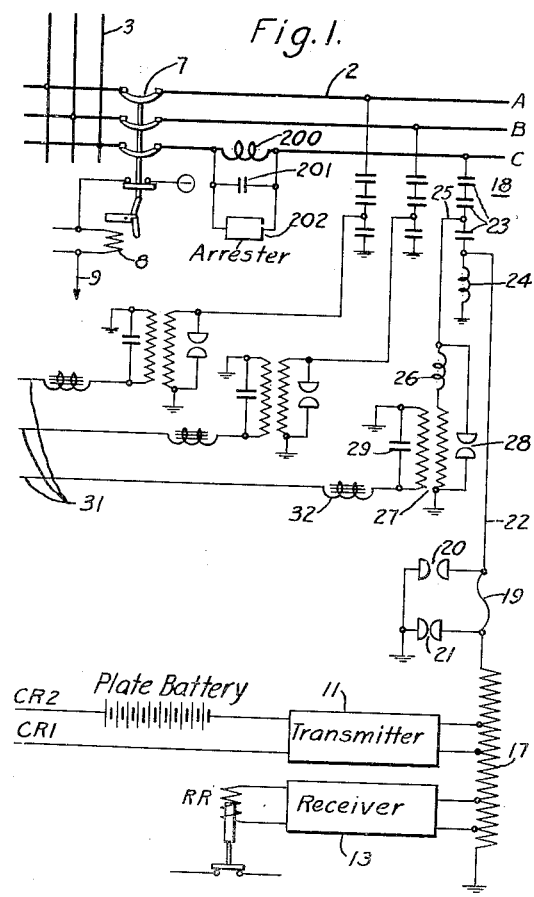

June 18, 1935.  P. O. LANGGUTH ET AL  2,005,147
COUPLING CAPACITOR SYSTEM
Filed Dec. 22, 1933

WITNESS

INVENTORS
Paul O. Langguth &
William A. Lewis
BY
O. B. Buchanan
ATTORNEY

Patented June 18, 1935

2,005,147

UNITED STATES PATENT OFFICE 2,005,147

COUPLING CAPACITOR SYSTEM

Paul O. Langguth, Irwin, and William A. Lewis, Wilkinsburg, Pa., assignors to Westinghouse Electric & Manufacturing Company, East Pittsburgh, Pa., a corporation of Pennsylvania Application December 22, 1933, Serial No. 703,608

17 Claims. (Cl. 175—294)

Our invention relates to coupling capacitors which are utilized either for obtaining a relatively small amount of low-potential energy from a relatively high-potential alternating-current transmission-line, or for obtaining a coupling between a relatively high-frequency carrier-current apparatus and the transmission line, or for both purposes at once.

The particular object of our invention is to provide an improved construction and arrangement of parts whereby a rugged and compact structure is provided, with a minimum of exposed high-potential parts, without the necessity of having conductors of relatively high potential extending from the coupling apparatus to other equipment, and with the maximum protection against possible excess-voltage surges or other excess-voltage conditions.

In a patent application of Paul O. Langguth, Serial No. 697,676, filed November 11, 1933, for Potential devices, an improved pedestal-type coupling capacitor is shown, for capacitor-potentiometer use, consisting of a plurality of serially connected capacitor units, each of said units having an insulating housing with capacitor-means therewithin, and conducting terminals for said housing, said terminals being so spaced that an external flash-over-path is provided, having a flashover-voltage which is considerably lower than the internal insulation-puncture-strength of the capacitor-means within the housing. A novel feature about the device covered in this Langguth application is the fact that the bottom unit, which is connected to ground, is a multi-capacitor unit having a plurality of serially connected capacitor-elements therewithin, and having an intermediate tap-connection between two of said serially connected capacitor-elements, and a tap-conductor extending from said intermediate tap-connection through the bottom housing-terminal at the ground end of said unit. This tap-conductor is then taken out in some way from the grounded base of the capacitor pedestal, and led off to the potential-transformer equipment. This structure presents the advantage that it would be impossible for a high-potential surge to get over into the potential-transformer equipment, because of the preferential flashover-path extending around the bottom capacitor unit.

In accordance with one feature of our present invention, the base of a pedestal-type coupling capacitor is enlarged and made hollow, and the potential-transformer apparatus is disposed in this hollow base, thereby avoiding the necessity for providing insulator supports for the tap-conductor which formerly extended between the coupling capacitor and the potential unit, and also giving considerably more protection against exposed high-potential circuits and the possibility of flashover or failures therefrom. The low-voltage secondary potential-circuits are simply brought out from the base of the capacitor unit, without the necessity for any high-voltage wires except the lead-in wire from the transmission-line conductor, and with a maximum of protection against excessive voltages, and all this with an absolutely rugged and sturdy construction in a compact space.

In accordance with another feature of our invention, we provide means whereby a coupling-capacitor means, preferably of a pedestal type, may be utilized advantageously as a carrier-current coupling means, and we accomplish this by insulating the grounded terminal of the capacitor-stack from the grounded supporting structure, and interposing a drain coil between said capacitor terminal and the ground, said drain coil offering a high impedance to carrier-frequency currents while permitting the line-frequency charging currents of the capacitor-frequency stack to be conducted to ground, said drain coil being shunted by the carrier-current equipment which is usually coupled thereto by means of an auto-transformer of relatively low impedance to the carrier-frequency currents.

Our invention further relates to novel protective means associated with the coupling carrier-frequency equipment whereby the fullest possible protection is secured in the event of an excessive-voltage surge thereon.

Figure 2:
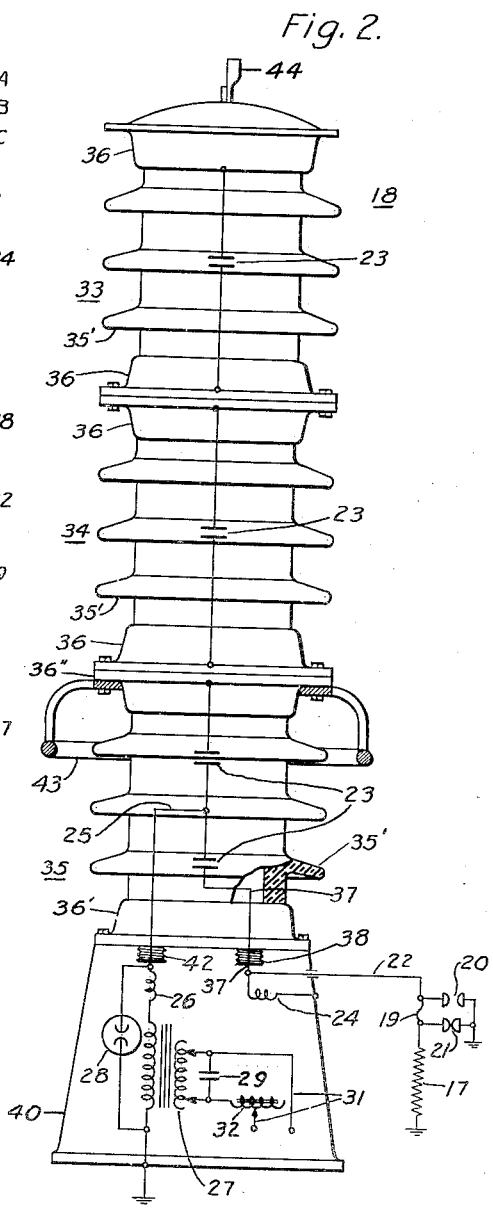

With the foregoing and other objects in view, our invention consists in the apparatus, combinations, sub-combinations, systems, and methods hereinafter described and claimed and illustrated in the accompanying drawing, wherein Figure 1 is a diagrammatic view of circuits and apparatus illustrating the application of our invention to a three-phase transmission-line; and Fig. 2 is an elevational view, somewhat diagrammatically illustrating the construction and arrangement of the several parts in accordance with a preferred form of embodiment of our invention.

The invention as illustrated in application to a transmission system comprising a three-phase line 2 connected to a bus 3. The line 2 is provided with a circuit breaker 7 having a trip coil 8 and a trip-circuit conductor 9, the control of which constitutes no part of our present invention, except that it may embody relaying equipment which is energized from equipment which is connected to our coupling capacitor.

The line 2 has superposed thereon carrier currents of relatively high frequency, as a means for securing quick tripping for all faults in the line-section to be protected. This carrier current is produced, at each end of the line-section, in a transmitter 11 which is indicated schematically by a rectangle, as the details of it are not necessary to an understanding of the present invention. It may be a transmitter similar to that which is shown in the application of William A. Lewis and Robert D. Evans, Serial No. 660,342, filed March 11, 1933, for Protective relay systems. The transmitter is provided with a plate circuit CR1—CR2, the opening of which instantly interrupts the transmission.

The carrier-current equipment at each end of the line 2 also includes a receiver 13 which is indicated only schematically, but it may be substantially as shown and described in the aforementioned Lewis and Evans application. The receiver 13 serves to energize a receiver relay RR which is utilized in the control of the trip-circuit conductor 9, by any suitable control-means (not shown), the details of which are not essential to an understanding of our invention.

The transmitter and receiver 11 and 13 are coupled to phase-conductor C of the transmission line 2 by means of tap connections on an air-core, carrier-frequency inductor or auto-transformer 17, and a combined coupling capacitor and capacitor-potentiometer designated in its entirety by the numeral 18, which constitutes the particular subject-matter of the present invention.

Interposed between the inductor 17 and the coupling device 18 is a fuse 19, the terminals of which are connected to ground through gap devices 20 and 21. Gap 21, which is connected to the terminal of the inductor 17, is set closer than gap 20 so that, in case a high voltage should reach the coupling-lead 22, the gap 21 would discharge first and divert the surge to ground. In case of power-current following the discharge, the rush of current through the fuse 19 to this gap 21 would blow the fuse 19. Upon the blowing of the fuse 19 the voltage across the other gap 20 would then rise to a value sufficient to discharge this other gap, thus permitting the fuse to clear, and isolating the carrier-current equipment 11, 13, 17. The arc across the gap 20 may continue until it is cleared by the circuit breakers at the ends of the line.

The carrier-current equipment is illustrated as being connected from the phase-C conductor of the line, to ground.

The coupling-capacitor equipment 18 includes a string of capacitors 23 which are connected between the phase-C conductor and a drain coil 24, the other terminal of which is grounded, the carrier-frequency coupling-connection 22 being made between the drain coil 24 and the last capacitor unit of the string 23. The same capacitor-string is utilized as a capacitor-potentiometer which is tapped off at an intermediate point 25, from which a circuit is lead through a carrier-frequency choke-coil 26 to a potential transformer 27 which is protected by a gap device 28. The secondary circuit of the potential transformer is, or may be, shunted by a capacitor 29 which aids in the adjustment of the secondary voltage and also improves the voltage-regulation of the device.

It will be understood that all three phases of the line 2 are provided with capacitor voltage-equipments 18 similar to that just described for phase C, except that the carrier-current connection is utilized only in phase C. By this means, potential is supplied for a three-phase relaying-voltage line 31, the three conductors of which are connected to the respective secondary circuits of the potential transformers 27 through iron-core inductors 32, respectively, which provide tuned relaying-voltage circuits so as to compensate for the phase-angle displacement across the capacitor unit or units 23 between the intermediate tap 25 and ground.

The combined coupling-capacitor and capacitor-potentiometer 18 is shown more in detail in Fig. 2. The several serially connected capacitor-elements 23 are housed in a plurality of serially connected capacitor-units 33, 34 and 35, each of said units having an insulating housing 35' in which one or more of the capacitor elements 23 are disposed. Each insulating housing 35' has conducting terminal elements or plates 36, to which the terminals of the housed capacitor-elements 23 are respectively connected, except in the case of the grounded terminal 36' at the grounded end of the series, in which case the corresponding terminal 37 of the last capacitor-element 23 is carried down through an insulator 38 to the drain coil 24, the other terminal of which is grounded.

The coupling-circuit connection 22 to the fuse 19 and carrier-current transformer 17 is tapped off from the connection between the drain coil 24 and the capacitor terminal 37, as shown, the carrier-current equipment 17, 19, 20, 21 being disposed in any convenient location which may be either the same as, or different from, that of the potential-transformer 27, the disposition of which is about to be described.

The coupling-capacitor apparatus 18 is preferably, as shown, of the pedestal type, being mounted upon a hollow base-member 40 which is grounded as illustrated, the several units being suitably bolted together, or secured by any other equivalent means.

In accordance with our invention, the grounded supporting member 40 houses the potential-transformer equipment, including the potential-transformer 27, the carrier-current inductor or choke-coil 26, an evacuated tube 28 which serves as a spark-gap shunted around the primary of the transformer 27, or around both the transformer 27 and the choke coil 26, the small capacitor 29, and the iron-core reactor 32. The hollow base 40 also houses the drain coil 24, and it may also house other parts of the carrier-current equipment.

It will be noted that the bottom capacitor-unit 35, which is connected to the grounded housing 40, is in effect a multiple-capacitor unit, having a plurality of serially connected capacitor-elements 23 therewithin, and having the intermediate tap-connection 25 between two of said serially connected capacitor-elements. The tap-conductor 25 extends down through the bottom terminal plate 36' of the unit 35, and through an insulator 42, to the choke coil 26 and gap device 28, as shown.

The terminal-plates of the several insulator-housings 35' of the capacitor-units 33, 34 and 35 are so spaced that an external flashover-path is provided around each individual unit, having a flashover-voltage which is considerably lower than the internal insulation-puncture-strength of the capacitor-element or elements 23 within the several insulating housings 35'. The bottom capacitor-unit 35 is preferably provided with an arcing-ring 43 which is attached to its top terminal-plate 36'', so as to provide a reduced arcing space for external flashovers to the bottom terminal-plate 36' of this bottom capacitor-unit 35.

With the foregoing construction, an electric circuit-connection is made from the transmission-line conductor C to the top of the capacitor coupling device 18, by means of a connector 44 shown in Fig. 2. The low-voltage secondary potential leads 31 are carried out from the base 40, and if the carrier-current equipment is not also disposed in the base, the conductor 22 leading thereto is also carried out of the base, without any need for insulating supports for high-potential inductors, or pot-heads therefor, or for the special excess-voltage surge-hazards which were present in equipments for similar purposes, as previously known in the art. The enclosure of the potential-transformer equipment in a grounded base member automatically protects such equipment from the possibility of damage from excess-voltage surges coming in over the transmission line.

The potential-network circuit for the relaying-voltage lines 31 consists of the transformer 21, condenser 29, and reactor 32, all of which are preferably adjustable. It is substantially as shown and described in a patent to John F. Peters, No. 1,819,260, patented August 18, 1931. As therein pointed out, and as indicated above, the essential purpose of the inductive reactor 32 is to provide a tuned circuit with the capacitive reactance of the bottom capacitor unit 23 which is disposed between the tap-connection 25 and ground, so as to tune this network to provide correct secondary voltage and phase-angle based on the fundamental frequency of the transmission-line, in view of which it will be obvious that the reactor 32 may be included in either the primary or secondary circuit of the transformer 21.

The drain coil 24 and the choke coil 26 are similar in construction and are designed to offer a high inductive impedance to the high-frequency carrier-currents, and a low impedance to line-frequency currents. The carrier-current transformer 17, on the other hand, is designed to have a relatively low impedance to carrier current. The line-frequency charging currents of the capacitor-series 23 pass to ground through both the drain coil 24 and the carrier-current transformer 17, but the carrier currents are confined pincipally to the latter.

By reason of the high electrostatic capacity of the stack of capacitor units 23, as compared to the capacities available on capacitor bushings for the lead-in conductors of electrical devices such as circuit breakers and the like, the regulation and accuracy, under both transients and steady static conditions, obtainable with our capacitor-potentiometer device is far better than that which is obtainable with bushing-potential devices, both in regard to the voltage ratios and in regard to the phase-angle conditions.

Our device can be operated without the inductor 32 in the potential-device network, but the voltage regulation and phase-angle relations are relatively poor when this element is omitted.

As is customary in carrier-current relaying systems, a suitable carrier-frequency trap is utilized in the phase-conductor or conductors to which the carrier is coupled. In the particular form of embodiment shown in Fig. 1, this trap consists of an inductance coil 200 shunted by a capacitor 201 and a lightning arrester 202.

While we have shown our invention in a single illustrative form of embodiment, it will be understood that various modifications and alterations may be resorted to, as will be more or less obvious to those skilled in the art, without departing from the general basic principles of our invention. We desire, therefore, that the appended claims shall be accorded the broadest interpretation consistent with their language and the prior art.

We claim as our invention:

1. A capacitor coupling device comprising a plurality of serially connected capacitor-units, each of said units having an insulating housing with capacitor-means therewithin, and conducting terminals for said housing, means for making an electric-circuit connection from one end of the series to a transmission-line conductor, grounded means for the other end of the series, fastening means for securing the several parts together, the terminals of the capacitor-means within each of the several units being connected to the respective conducting terminals of the several units, except the end-terminal of the unit at the grounded end, said end-terminal being insulated and extending through the conducting terminal at the grounded end of said unit, and an inductor connected between said end-terminal and ground.

2. A pedestal-type capacitor coupling device comprising a plurality of serially connected capacitor-units, each of said units having an insulating housing with capacitor-means therewithin, and conducting terminals for said housing, means for making an electric-circuit connection from the top end of the series to a transmission-line conductor, a grounded base for the bottom end of the series, fastening means for securing the several parts together in pedestal-formation, the terminals of the capacitor-means within each of the several units being connected to the respective conducting terminals of the several units, except the bottom end-terminal of the bottom unit, said bottom end-terminal being insulated and extending through the conducting terminal at the grounded end of said bottom unit, and an inductor connected between said bottom end-terminal and ground.

3. The invention as defined in claim 1, characterized by the unit at the grounded end being a multiple-capacitor unit having a plurality of serially connected capacitor-elements therewithin, and having an intermediate tap-connection between two of said serially connected capacitor-elements, and a tap-conductor extending from said intermediate tap-connection through the housing-terminal at the grounded end of said unit.

4. The invention as defined in claim 2, characterized by the bottom unit being a multiple-capacitor unit having a plurality of serially connected capacitor-elements therewithin, and having an intermediate tap-connection between two of said serially connected capacitor-elements, and a tap-conductor extending from said intermediate tap-connection through the bottom terminal member of said bottom unit.

5. The invention as defined in claim 1, characterized by the unit at the grounded end being a multiple-capacitor unit having a plurality of serially connected capacitor-elements therewithin, and having an intermediate tap-connection between two of said serially connected capacitor-elements, and a tap-conductor extending from said intermediate tap-connection through the housing-terminal at the grounded end of said unit, and further characterized by a transformer and an excess-voltage protective device both connected between said intermediate tap-connection and ground, and both housed in said grounded supporting means.

6. The invention as defined in claim 2, characterized by the bottom unit being a multiple-capacitor unit having a plurality of serially connected capacitor-elements therewithin, and having an intermediate tap-connection between two of said serially connected capacitor-elements, and a tap-conductor extending from said intermediate tap-connection through the bottom terminal member of said bottom unit, and further characterized by a transformer and an excess-voltage protective device both connected between said intermediate tap-connection and ground, and both housed in said grounded base.

7. A capacitor-potentiometer coupling device comprising a multiple-capacitor unit having an insulating housing with a plurality of serially-connected capacitor-elements therewithin, and conducting terminals for said housing, said terminals being so spaced that an external flashover path is provided around said unit, having a flashover-voltage which is considerably lower than the internal insulation-puncture-strength of the capacitor-elements within the unit-housing, means for making an electric-circuit connection from one end of the series to a transmission-line conductor, and grounded means for the other end of the series, characterized by said capacitor-unit having an intermediate tap-connection between two of said serially connected capacitor-elements, and a tap-conductor extending from said intermediate tap-connection through the housing-terminal at the grounded end of said unit, and further characterized by a transformer and an excess-voltage protective device both connected between said intermediate tap-connection and ground, and both housed in said grounded means.

8. A pedestal-type capacitor-potentiometer coupling device comprising a multiple-capacitor unit having an insulating housing with a plurality of serially connected capacitor-elements therewithin, and conducting terminals for said housing, said terminals being so spaced that an external flashover-path is provided around said unit, having a flashover-voltage which is considerably lower than the internal insulation-puncture-strength of the capacitor-elements within the unit-housing, means for making an electric-circuit connection from the top end of the series to a transmission-line conductor, a grounded base for the bottom end of the series, and fastening means for securing the capacitor-unit and the base together in pedestal-formation, characterized by said capacitor-unit having an intermediate tap-connection between two of said serially connected capacitor-elements, and a tap-conductor extending from said intermediate tap-connection through the bottom terminal member of said capacitor-unit, and further characterized by a transformer and an excess-voltage protective device both connected between said intermediate tap-connection and ground, and both housed in said grounded base.

9. A capacitor coupling device comprising a multiple-capacitor unit having an insulating housing with a plurality of serially connected capacitor-elements therewithin, and conducting terminals for said housing, said terminals being so spaced that an external flashover-path is provided around said unit, having a flashover-voltage which is considerably lower than the internal insulation-puncture-strength of the capacitor-elements within the unit-housing, means for making an electric-circuit connection from one end of the series to a transmission-line conductor, and grounded shielding means for the other end of the series, characterized by said capacitor-unit having an intermediate tap-connection between two of said serially connected capacitor-elements, and a tap-conductor extending from said intermediate tap-connection through the housing-terminal at the grounded end of said unit, and further characterized by a transformer and an excess-voltage protective device both connected between said intermediate tap-connection and ground, and both housed in said grounded shielding means, and means associated with said transformer and also housed in said grounded supporting means, for providing a tuned voltage-network.

10. A pedestal-type capacitor coupling device comprising a multiple-capacitor unit having an insulating housing with a plurality of serially connected capacitor-elements therewithin, and conducting terminals for said housing, said terminals being so spaced that an external flashover-path is provided around said unit, having a flashover-voltage which is considerably lower than the internal insulation-puncture-strength of the capacitor-elements within the unit-housing, means for making an electric-circuit connection from the top end of the series to a transmission-line conductor, a grounded base for the bottom end of the series, and fastening means for securing the capacitor-unit and the base together, characterized by said capacitor-unit having an intermediate tap-connection between two of said serially connected capacitor-elements, and a tap-conductor extending from said intermediate tap-connection through the bottom terminal member of said capacitor-unit, and further characterized by a transformer and an excess-voltage protective device both connected between said intermediate tap-connection and ground, and both housed in said grounded base, and means associated with said transformer, and also housed in said grounded base, for providing a tuned voltage network.

11. A capacitor coupling device comprising a plurality of serially connected capacitor units, each of said units having an insulating housing with capacitor-means therewithin, and conducting terminals for said housing, means for making an electric-circuit connection from one end of the series to a transmission-line conductor, grounded supporting means for the other end of the series, fastening means for securing the several parts together, the terminals of the capacitor-means within each of the several units being connected to the respective conducting terminals of the several units, except the end-terminal of the unit at the grounded end, said end-terminal being insulated and extending through the conducting terminal at the grounded end of said unit, an inductor connected between said end-terminal and ground and housed within said grounded supporting means, a conductor extending from the capacitor side of said inductor, and excess-current-responsive circuit-interrupting means in series with said conductor, an excess-voltage protective device connected between said circuit-interrupting means and ground on the capacitor side thereof, and a second excess-voltage protective device connected between said circuit-interrupting means and ground, but on the other side of said circuit-interrupting means, said second excess-voltage protective device being set to have the lower breakdown-voltage so that it will discharge at a lower voltage than the first-mentioned excess-voltage protective device.

12. A capacitor coupling device comprising a plurality of serially connected capacitor elements having one end connected to an electrical conductor to which a coupling is to be made, and having the other end insulated from ground, an inductor connected between said end-terminal and ground, a conductor extending from the capacitor side of said inductor, an excess-current-responsive circuit-interrupting means in series with said conductor, an excess-voltage protective device connected between said circuit-interrupting means and ground on the capacitor side thereof, and a second excess-voltage protective device connected between said circuit-interrupting means and ground, but on the other side of said circuit-interrupting means, said second excess-voltage protective device being set to have the lower breakdown-voltage so that it will discharge at a lower voltage than the first-mentioned excess-voltage protective device.

13. An impedance device comprising a plurality of serially connected impedance elements enclosed in a protective casing, two electrical terminations, at the extremities of said impedance device, for connection to external conductors, an intermediate tap connection to said impedance device so brought out through said protective casing that the path of external flashover between said electrical terminations will not include the said intermediate tap connection, characterized by the fact that the impedance between the tap and one end extremity shall offer a relatively greater impedance to currents of a first frequency and a relatively lesser impedance to currents of a second frequency and the impedance between the tap and the other extremity shall offer a relatively lesser impedance to currents of said first frequency and a relatively greater impedance to currents of said second frequency.

14. A potentiometer-coupling device comprising a multiple-potentiometer unit having an insulating housing with a plurality of serially connected potentiometer-elements therewithin, and conducting terminals for said housing, said terminals being so spaced that an external flashover-path is provided around said unit, having a flashover-voltage which is considerably lower than the internal excess-voltage strength of the potentiometer-elements within the unit-housing, means for making an electric-circuit connection from one end of the series to a transmission-line conductor, and grounded means for the other end of the series, characterized by said potentiometer-unit having an intermediate tap-connection between two of said serially connected potentiometer-elements, and a tap-conductor extending from said intermediate tap-connection through the housing-terminal at the grounded end of said unit, and further characterized by a transformer and an excess-voltage protective device both connected between said intermediate tap-connection and ground, and both housed in said grounded means.

15. A pedestal-type potentiometer-coupling device comprising a multiple-potentiometer unit having an insulating housing with a plurality of serially connected potentiometer-elements therewithin, and conducting terminals for said housing, said terminals being so spaced that an external flashover-path is provided around said unit, having a flashover-voltage which is considerably lower than the internal excess-voltage strength of the potentiometer-elements within the unit-housing, means for making an electric-circuit connection from the top end of the series to a transmission-line conductor, a grounded base for the bottom end of the series, and fastening means for securing the potentiometer-unit and the base together in pedestal-formation, characterized by said potentiometer-unit having an intermediate tap-connection between two of said serially connected potentiometer-elements, and a tap-conductor extending from said intermediate tap-connection through the bottom terminal member of said potentiometer-unit, and further characterized by a transformer and an excess-voltage protective device both connected between said intermediate tap-connection and ground, and both housed in said grounded base.

16. A potentiometer-coupling device comprising a multiple-potentiometer unit having an insulating housing with a plurality of serially connected potentiometer-elements therewithin, and conducting terminals for said housing, said terminals being so spaced that an external flashover-path is provided around said unit, having a flashover-voltage which is considerably lower than the internal excess-voltage strength of the potentiometer-elements within the unit-housing, means for making an electric-circuit connection from one end of the series to a transmission-line conductor, and grounded shielding means for the other end of the series, characterized by said potentiometer-unit having an intermediate tap-connection between two of said serially connected potentiometer-elements, and a tap-conductor extending from said intermediate tap-connection through the housing-terminal at the grounded end of said unit, and further characterized by an adjustable voltage-network assembly and an excess-voltage protective device both connected between said intermediate tap-connection and ground, and both housed in said grounded shielding means, for providing low-voltage energy which is adjustable.

17. A pedestal-type potentiometer-coupling device comprising a multiple-potentiometer unit having an insulating housing with a plurality of serially connected potentiometer-elements therewithin, and conducting terminals for said housing, said terminals being so spaced that an external flashover-path is provided around said unit, having a flashover-voltage which is considerably lower than the internal excess-voltage strength of the potentiometer-elements within the unit-housing, means for making an electric-circuit connection from the top end of the series to a transmission-line conductor, a grounded base for the bottom end of the series, and fastening means for securing the potentiometer-unit and the base together in pedestal-formation, characterized by said potentiometer-unit having an intermediate tap-connection between two of said serially connected potentiometer-elements, and a tap-conductor extending from said intermediate tap-connection through the bottom terminal member of said potentiometer-unit, and further characterized by an adjustable voltage-network assembly and an excess-voltage protective device both connected between said intermediate tap-connection and ground, and both housed in said grounded supporting means, for providing low-voltage energy which is adjustable.

PAUL O. LANGGUTH.
WILLIAM A. LEWIS.